US012670767B2

(12) United States Patent
Ludwick

(10) Patent No.: US 12,670,767 B2
(45) Date of Patent: Jun. 30, 2026

(54) SYSTEMS AND METHODS FOR BULK INCREMENTING A BONUS PRIZE AND REPEATEDLY PROVIDING THE BONUS PRIZE IN ASSOCIATION WITH A PLURALITY OF FREE SPINS

(71) Applicant: Aristocrat Technologies, Inc., Las Vegas, NV (US)

(72) Inventor: John Ludwick, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 18/417,473

(22) Filed: Jan. 19, 2024

(65) Prior Publication Data

US 2024/0161584 A1 May 16, 2024

Related U.S. Application Data

(63) Continuation of application No. 17/006,373, filed on Aug. 28, 2020, now Pat. No. 11,922,769.

(Continued)

(51) Int. Cl.
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
CPC ............. G07F 17/3267; G07F 17/3213; G07F 17/3244
See application file for complete search history.

(56) References Cited

U.S. PATENT DOCUMENTS 5,584,763 A * 12/1996 Kelly ........................ A63F 5/04 463/16
7,371,166 B1 5/2008 Webb
(Continued)

OTHER PUBLICATIONS

Office Action (Non-Final Rejection) dated Nov. 26, 2021 for U.S. Appl. No. 17/006,373 (pp. 1-12).
(Continued)

*Primary Examiner* — Jeffrey K Wong
(74) *Attorney, Agent, or Firm* — Armstrong Teasdale LLP

(57) ABSTRACT

An electronic gaming machine includes a processor configured to control a display device to display a matrix of symbol positions and a bonus meter, where the bonus meter displays a bonus prize. In response to a bonus game trigger condition being satisfied, the processor is configured to control the display device to display a plurality of volatility options, each being player selectable and associated with a number of free spins and a multiple or another percentage of the bonus prize. A player selection of one volatility option is received, and a plurality of free spins are initiated. During each free spin, the processor is configured to control the display device to display a symbol in each symbol position of the matrix, evaluate the matrix to determine whether the matrix includes at least one free game scatter symbol, and if at least one free game scatter symbol is included, to add the multiple or percentage of the bonus prize to a credit balance of the player, whereby the multiple or percentage of the bonus prize is capable of being repeatedly added to the credit balance of the player during the first plurality of free spins.

18 Claims, 12 Drawing Sheets

Related U.S. Application Data

(60) Provisional application No. 62/895,119, filed on Sep. 3, 2019, provisional application No. 62/894,227, filed on Aug. 30, 2019.

(56) References Cited

U.S. PATENT DOCUMENTS

| | | | | |
|---|---|---|---|---|
| 11,922,769 | B2 * | 3/2024 | Ludwick | G07F 17/3213 |
| 2005/0017448 | A1 * | 1/2005 | Scibetta | A63F 3/00157 463/9 |
| 2006/0116208 | A1 * | 6/2006 | Chen | G06F 9/545 463/43 |
| 2007/0060252 | A1 * | 3/2007 | Taylor | G07F 17/32 463/16 |
| 2009/0124371 | A1 * | 5/2009 | Gilmore | G07F 17/3258 463/27 |
| 2010/0227668 | A1 * | 9/2010 | Scibetta | G07F 17/3293 463/25 |
| 2013/0225268 | A1 | 8/2013 | Caputo | |
| 2013/0344939 | A1 | 12/2013 | Aoki | |
| 2017/0228976 | A1 * | 8/2017 | Chesworth | G07F 17/3262 |
| 2018/0158277 | A1 | 6/2018 | Reeves | |
| 2020/0074813 | A1 | 3/2020 | Cuddy | |
| 2020/0105092 | A1 | 4/2020 | Watkins | |

OTHER PUBLICATIONS

Office Action (Non-Final Rejection) dated Jun. 23, 2022 for U.S. Appl. No. 17/006,373 (pp. 1-8).
Office Action (Final Rejection) dated Dec. 6, 2022 for U.S. Appl. No. 17/006,373 (pp. 1-17).
Office Action (Notice of Allowance and Fees Due (PTOL-85)) dated Nov. 1, 2023 for U.S. Appl. No. 17/006,373 (pp. 1-5).
Office Action (Notice of Allowance and Fees Due (PTOL-85)) dated Dec. 15, 2023 for U.S. Appl. No. 17/006,373 (pp. 1-2).

* cited by examiner

1000

SYSTEMS AND METHODS FOR BULK INCREMENTING A BONUS PRIZE AND REPEATEDLY PROVIDING THE BONUS PRIZE IN ASSOCIATION WITH A PLURALITY OF FREE SPINS

RELATED APPLICATIONS

This application is a continuation of U.S. patent application Ser. No. 17/006,373, filed Aug. 28, 2020, which claims priority to U.S. Provisional Patent Application 62/895,119, filed Sep. 3, 2019 and U.S. Provisional Patent Application 62/894,227, filed Aug. 30, 2019, both of which are incorporated herein by reference in their entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Many conventional wagering games may also include a bonus award, such as a progressive or jackpot award, which may be displayed in a location that is visible to a player and that may be awarded to a player under a variety of conditions. Traditionally, however, these awards are static or simply incremented as a function of wager amount (e.g., typically, 2-3% of a player's wager). Conventional bonus awards are not, however, increased in bulk based upon credit or cash values landing on the reels. Conventional wagering games also only provide a given bonus or jackpot award to a player once. For example, although a player may win a bonus award as a result of a combination of symbols appearing on the reels, bonus awards are not typically provided to a player over and over again. Moreover, although some known wagering games include volatility selection options, these games do not traditionally include any mechanism for increasing a bonus award to an even higher value when a player selects a volatility option.

SUMMARY

In one aspect, an electronic gaming machine is provided. The electronic gaming machine includes a display device, a processor, and a memory storing instructions, which when executed by the processor, cause the processor to at least: control the display device to display a plurality of symbol positions and a bonus meter, the bonus meter displaying an award amount, determine a base game outcome, the base game outcome comprising a plurality of symbols displayed at the plurality of symbol positions, in response to a bonus game trigger condition being satisfied in the base game outcome, control the display device to display a plurality of volatility options, each volatility option associated with a number of free spins and a multiple of the award amount, receive a selection of a first volatility option of the plurality of volatility options, the first volatility option associated with a first plurality of free spins and a first multiple of the award amount, and initiate the first plurality of free spins, and for each spin of the first plurality of free spins, at least: determine an outcome for the spin, the outcome of the spin comprising a plurality of symbols, control the display device to display the plurality of symbols in a plurality of bonus symbol positions, evaluate the plurality of bonus symbol positions to determine whether the plurality of bonus symbol positions include a first quantity of bonus award trigger symbols, and in response to determining that the plurality of bonus symbol positions include the first quantity of bonus award trigger symbols, add the first multiple of the award amount to a free spin award amount.

In another aspect, a computer implemented method is provided. The method includes controlling, by a processor, a display device to display a plurality of symbol positions and a bonus meter, the bonus meter displaying an award amount, determining, by the processor, a base game outcome, the base game outcome comprising a plurality of symbols displayed at the plurality of symbol positions, in response to a bonus game trigger condition being satisfied in the base game outcome, controlling, by the processor, the display device to display a plurality of volatility options, each volatility option associated with a number of free spins and a multiple of the award amount, receiving a selection of a first volatility option of the plurality of volatility options, the first volatility option associated with a first plurality of free spins and a first multiple of the award amount, and initiating the display of the first plurality of free spins, and for each spin of the first plurality of free spins, at least: determining an outcome for the spin, the outcome of the spin comprising a plurality of symbols, controlling the display device to display the plurality of symbols in a plurality of bonus symbol positions, evaluating the plurality of bonus symbol positions to determine whether the plurality of bonus symbol positions include a first quantity of bonus award trigger symbols, and in response to determining that the plurality of bonus symbol positions include the first quantity of bonus award trigger symbols, adding the first multiple of the award amount to a free spin award amount.

In another aspect, a method of operating a gaming device is provided. The method includes controlling, by a processor, a display device to display a matrix of symbol positions and a bonus meter, the matrix including a plurality of columns and a plurality of rows, the bonus meter including a bonus prize, in response to a bonus game trigger condition being satisfied, controlling, by the processor, the display device to display a plurality of volatility options, each volatility option selectable by a player of the electronic gaming machine and associated with a number of free spins and a multiple or percentage of the bonus prize, receiving, by the processor, a player selection of a first volatility option of the plurality of volatility options, the first volatility option associated with a first plurality of free spins and a first multiple or percentage of the bonus prize, and initiating, by the processor, the first plurality of free spins, and during each free spin of the first plurality of free spins, at least: controlling, by the processor, the display device to display a symbol in each symbol position of the matrix of symbol positions, evaluating, by the processor, the matrix of symbol positions to determine whether the matrix includes at least one free game scatter symbol, and in response to determining that the matrix includes the at least one free game scatter symbol, adding, by the processor, the first multiple or percentage of the bonus prize to a credit balance of the player, whereby the first multiple or percentage of the bonus prize is capable of being repeatedly added to the credit balance of the player during the first plurality of free spins.

In one more aspect, a non-transitory, computer-readable storage medium having instructions stored thereon is provided. The instructions when executed by a processor, cause the processor to control a display device to display a plurality of symbol positions and a bonus meter, the bonus meter displaying an award amount, determine a base game outcome, the base game outcome comprising a plurality of symbols displayed at the plurality of symbol positions, in response to a bonus game trigger condition being satisfied in the base game outcome, control the display device to display a plurality of volatility options, each volatility option associated with a number of free spins and a multiple of the award amount, receive a selection of a first volatility option of the plurality of volatility options, the first volatility option associated with a first plurality of free spins and a first multiple of the award amount, and control the display device to initiate the first plurality of free spins, and for each spin of the first plurality of free spins, at least: determine an outcome for the spin, the outcome of the spin comprising a plurality of symbols, control the display device to display the plurality of symbols in a plurality of bonus symbol positions, evaluate the plurality of bonus symbol positions to determine whether the plurality of bonus symbol positions include a first quantity of bonus award trigger symbols, and in response to determining that the plurality of bonus symbol positions include the first quantity of bonus award trigger symbols, add the first multiple of the award amount to a free spin award amount.

In yet another aspect, a non-transitory, computer-readable storage medium having instructions stored thereon is provided. The instructions when executed by a processor, cause the processor to at least control a display device to display a matrix of symbol positions and a bonus meter, the matrix including a plurality of columns and a plurality of rows, the bonus meter including a bonus prize, in response to a bonus game trigger condition being satisfied, control the display device to display a plurality of volatility options, each volatility option selectable by a player of the electronic gaming machine and associated with a number of free spins and a multiple or percentage of the bonus prize, receive a player selection of a first volatility option of the plurality of volatility options, the first volatility option associated with a first plurality of free spins and a first multiple or percentage of the bonus prize, and initiate the first plurality of free spins, and during each free spin of the first plurality of free spins, at least: control the display device to display a symbol in each symbol position of the matrix of symbol positions; evaluate the matrix of symbol positions to determine whether the matrix includes at least one free game scatter symbol; and in response to determining that the matrix includes the at least one free game scatter symbol, add the first multiple or percentage of the bonus prize to a credit balance of the player, whereby the first multiple or percentage of the bonus prize is capable of being repeatedly added to the credit balance of the player during the first plurality of free spins.

DETAILED DESCRIPTION

Embodiments of the present disclosure provide systems and methods for incrementing a bonus prize based upon credit values displayed on designated symbols appearing in a matrix of symbol positions of a base game. In addition to incrementing the bonus prize during the base game, a bonus game may be triggered based upon the occurrence of one or more designated symbols in the matrix. During the bonus game, a player may select a volatility option, which may be used to determine to adjust (e.g., increase) the prize value accumulated in the base game. The selected volatility option may also specify a number of free spins. Once a volatility selection is made by the player, the player is awarded the number of free spins associated with the option, and during each free spin, if any designated symbols land in the matrix, the player is provided the adjusted prize value for each occurrence of a designated symbol. Thus, the adjusted prize value may be repeatedly provided to a player over the course of a plurality of free spins.

Figure 1:
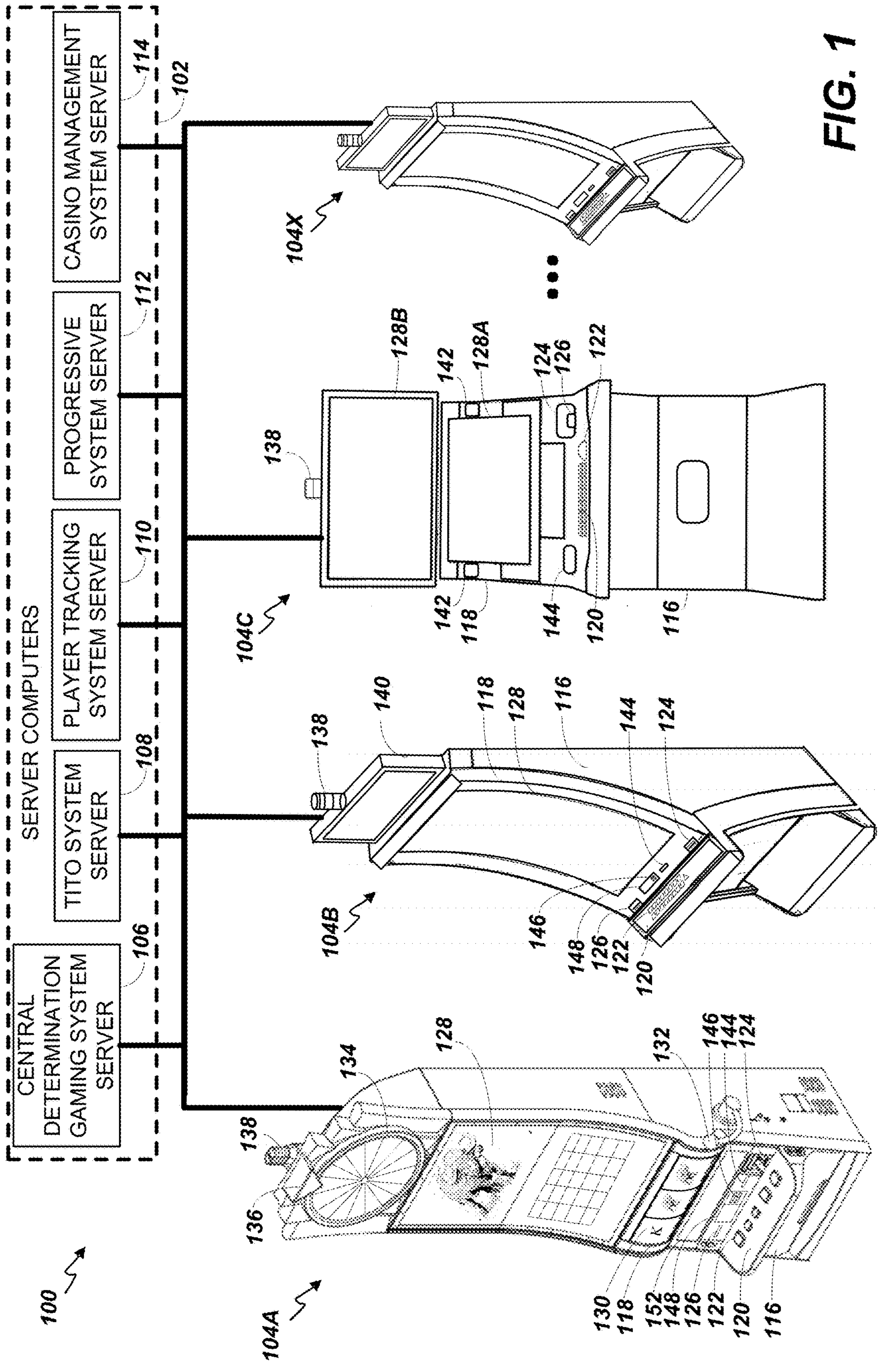
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
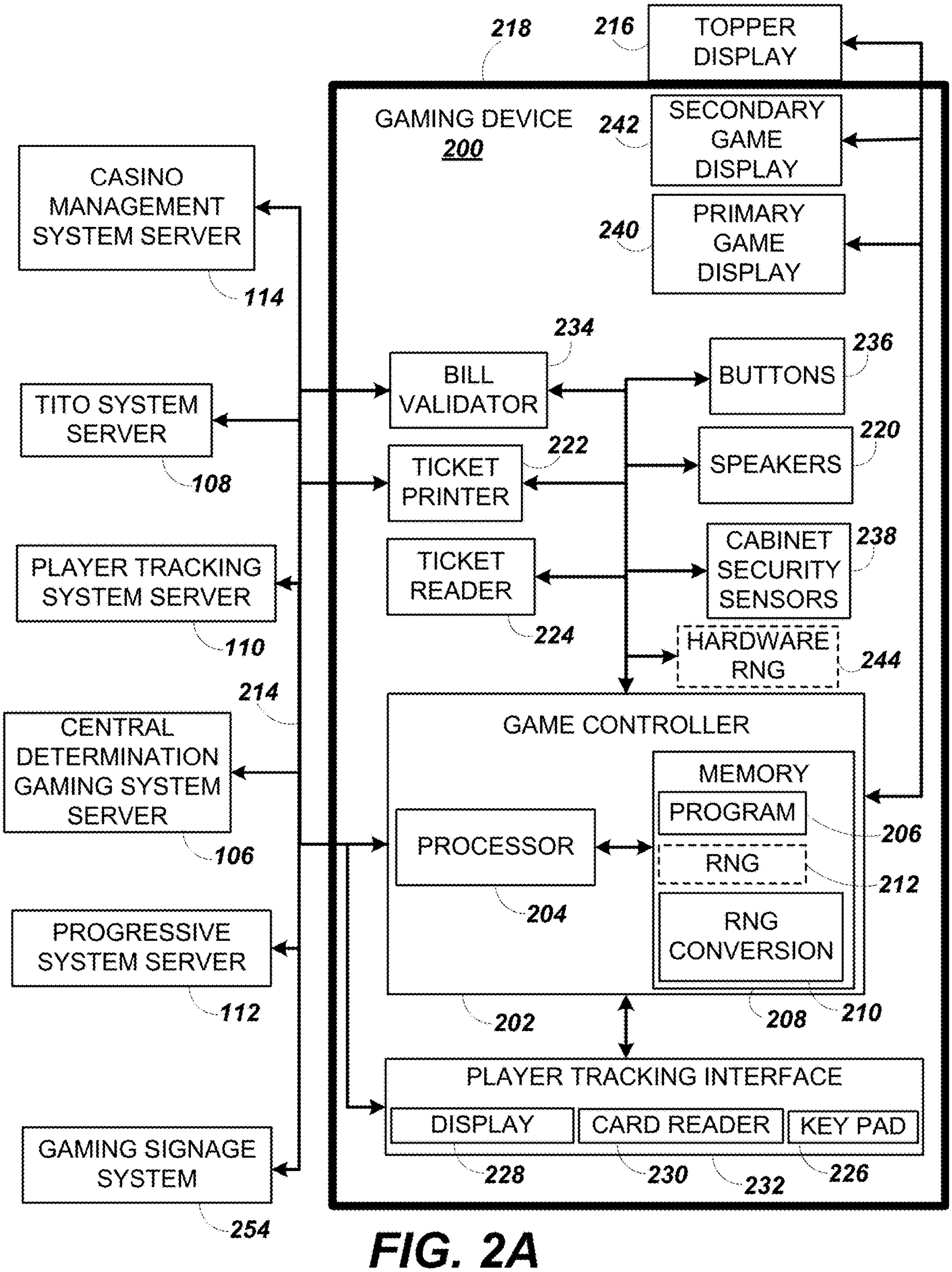
FIG. 2A is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2A but shown in FIG. 1). For purpose of this disclosure, the term “game instance” refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 includes an RNG 212 and/or hardware RNG 244 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP Similar to the randomness requirement discussed above, numerous gaming jurisdictions also mandate that gaming device 200 provides a minimum level of RTP (e.g., RTP of at least 75%). FIG. 2A illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2A illustrates specific embodiments of a gaming device (e.g., gaming devices 104A-104X and 200), the disclosure is not limited to those embodiments shown in FIGS. 1 and 2A. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
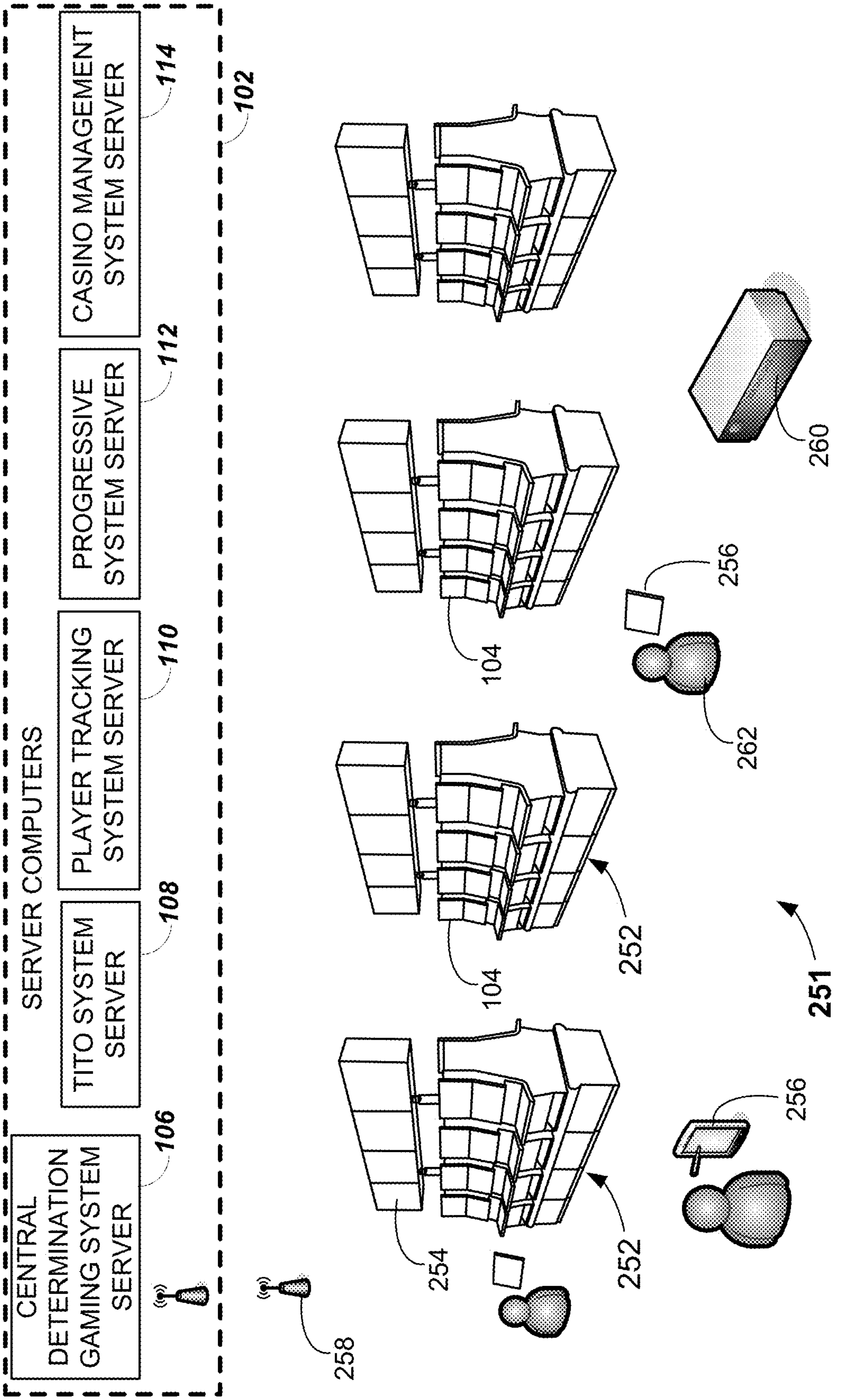
FIG. 2B depicts a casino gaming environment according to one example.

FIG. 2B depicts a casino gaming environment 251 according to one example. In this example, each bank 252 of EGMs 104 (shown in FIG. 1) includes a corresponding gaming signage system 254 (also shown in FIG. 2A). Environment 251 includes mobile devices 256. In this example, the mobile devices 256 may be communication with one or more other devices in the casino 251, including one or more of the server computers 102, via wireless access points 258. In some implementations, the casino 251 may include one or more kiosks 260 for use by one or more patrons 262.

Figure 2C:
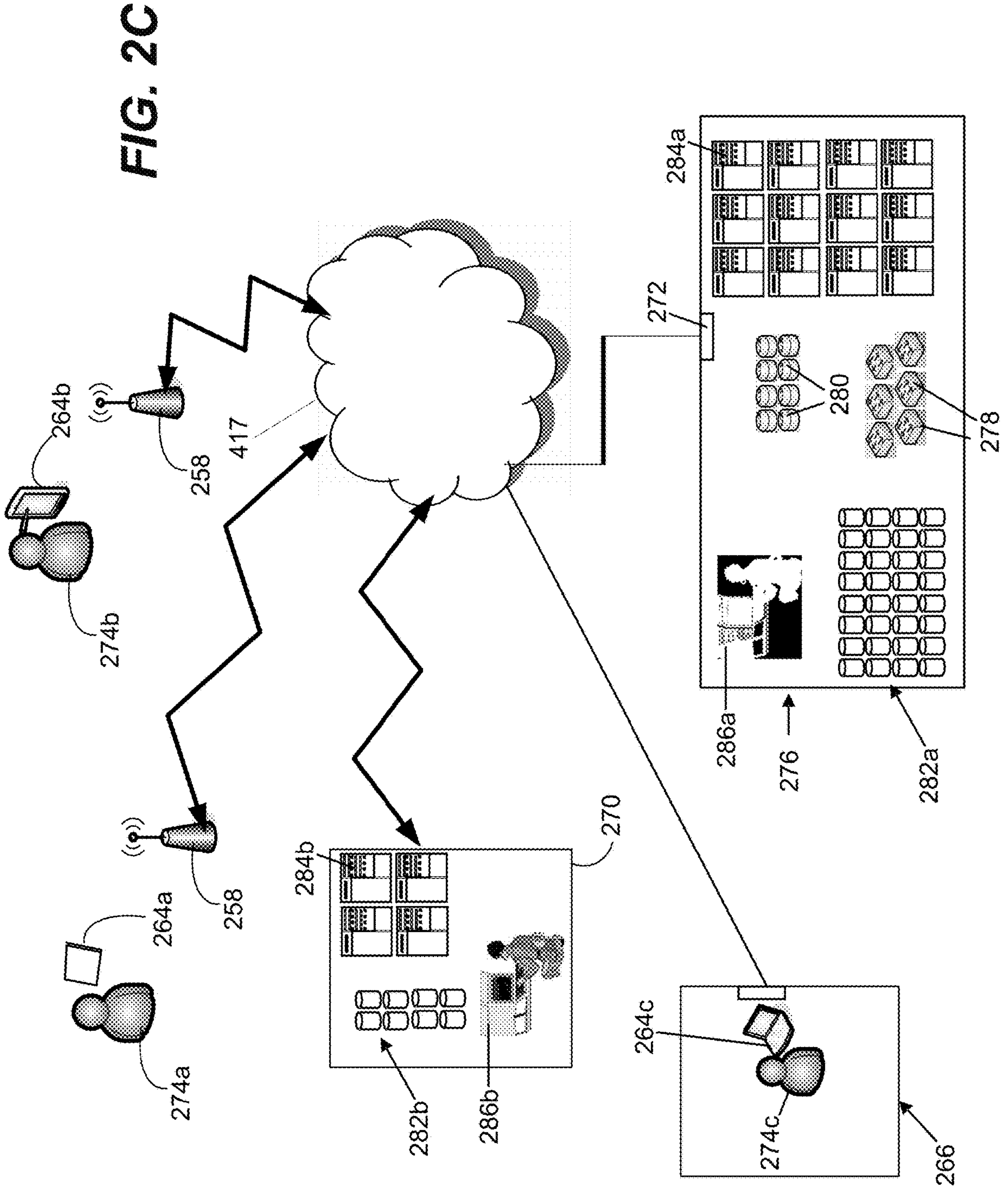
FIG. 2C is a diagram that shows examples of components of a system for providing online gaming according to some aspects of the present disclosure.

FIG. 2C is a diagram that shows examples of components of a system for providing online gaming according to some aspects of the present disclosure. In this example, mobile devices 264*a*, 264*b*, and 264*c* are operated by users 274*a*-274*c* and are capable of communication via one or more networks 417. A mobile device 264*c* may be within a residence 266. A data center 276 is capable of communication with the networks 417 via a gateway 272. In this example, switches 278 and routers 280 are configured to provide network connectivity for devices of the data center 276, including storage devices 282*a*, servers 284*a*, and one or more workstations 286*a*. In this example, a data center 270 is also configured for communication via the networks 417. Here, the data center 270 includes storage devices 282*b*, servers 284*b*, and one or more workstations 286*b*.

Figure 3:
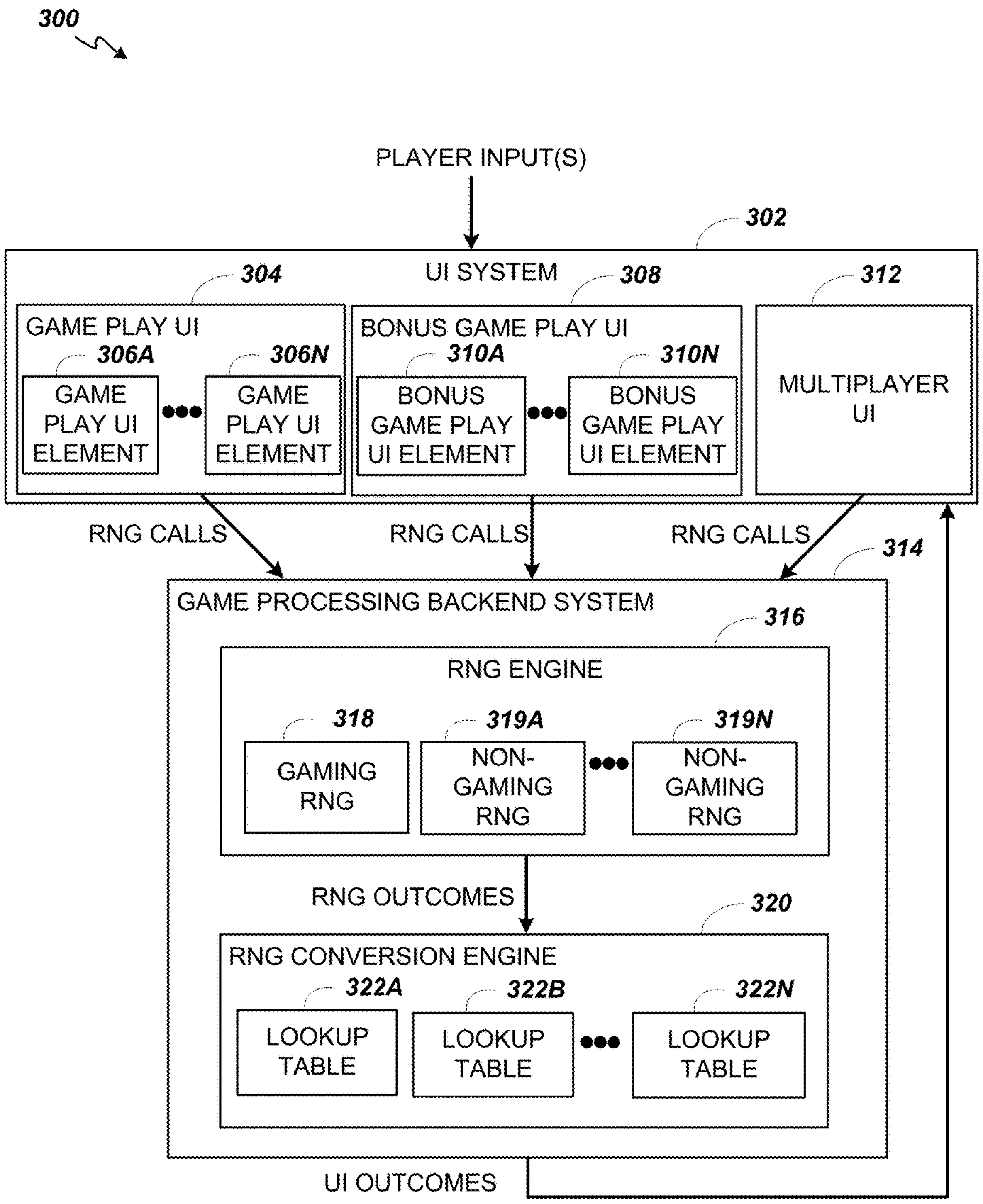
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2A, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 304, and one or more multiplayer UIs 306, where each UI type includes one or more mechanical UIs and/or graphical UIs (GUIs). In other words, game play UI 304, bonus game play UI 304, and the multiplayer UI 304 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

FIG. 3 also illustrates that UI system 302 could include a multiplayer UI 312 purposed for game play that differ or is separate from the typical base game. For example, multiplayer UI 302 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming device. The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

Figure 4:
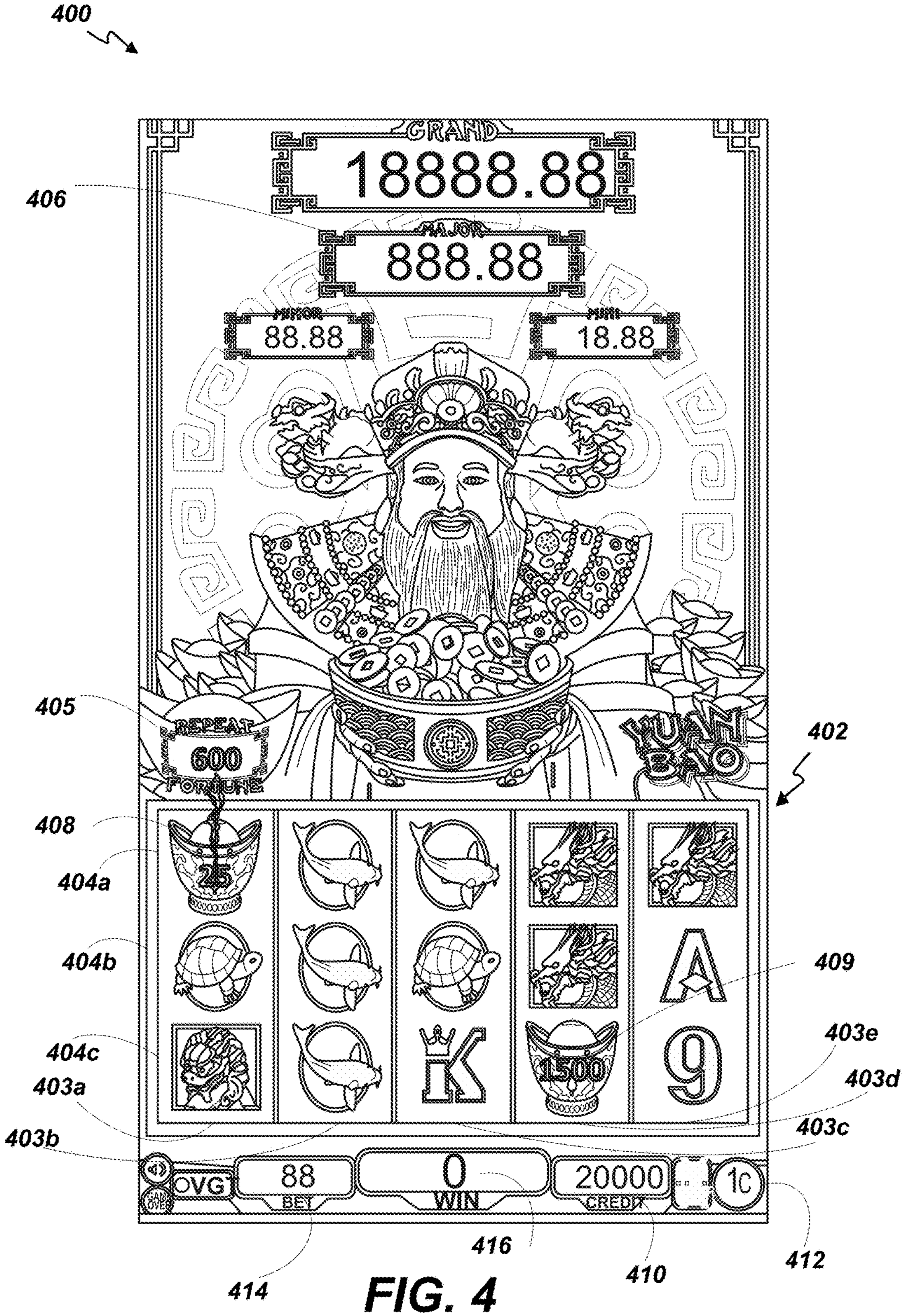
FIG. 4 is a screenshot of a wagering game played on an EGM, as shown in FIG. 1 and FIG. 2A, in which a first designated symbol is displayed in a matrix of symbol positions, and in which a prize associated with the first designated symbol is added to a bonus meter.

FIG. 4 is an example screen of a user interface 400 in accordance with various aspects of the present disclosure. In the example screen of FIG. 4, user interface 400 shows a game that includes a matrix of symbol positions 402 (or simply "matrix" 402). The symbol positions of matrix 402 are arranged in a plurality of rows and a plurality of columns. More particularly, in the example embodiment, matrix 402 is a 3×5 matrix having three rows and five columns. However, in other embodiments, matrix 402 may be any size (e.g., 2×2, 3×3, 4×4, 10×10, etc.). In other embodiments, matrix 402 may be non-rectangular, such as a 3×4×5×4×3 configuration, or any other configuration.

Each row of matrix 402 is designated as 404*a*, 404*b*, and 404*c*. Each column of matrix 402 is designated as 403*a*, 403*b*, 403*c*, 403*d*, and 403*e*. As a result, and in the example embodiment, matrix 402 includes fifteen symbol positions. However, a number of symbol positions in matrix 402 may vary depending upon a number of rows and columns displayed in matrix 402. In some embodiments, matrix 402 may be replaced by one or more mechanical reels, and the embodiments described herein work equally well with mechanical reels as with matrix 402. Further, each column 403*a-e* of matrix 402 may be represented as a virtual reel that can be displayed as spinning After each reel stops, symbols displayed on the reel match up with display positions on matrix 402.

As described herein, during play of user interface 400, symbols may be selected (e.g., such as from a plurality of reel strips) and displayed in the symbol positions of each column of symbols within matrix 402. A "reel strip" may include a plurality of symbols arranged in a vertical column. To display symbols from a reel strip in a column of symbol positions within matrix 402, processor 204 may simulate spinning and stopping of a reel containing that reel strip within one or more columns of matrix 402. Here again, however, mechanical reels having physical reel strips may be used as well.

When a respective reel is simulated to stop within an associated column, one or more symbols may be displayed from the reel strip in the symbol positions of the column. Processor 204 may use a random number generator to generate a random number to determine the reel stop position of each of the reels. The symbols displayed after spinning and stopping each reel in a respective column of matrix 402 may be referred to herein as a "reel outcome" or a "reel game outcome." Thus, a rotation and stopping of a plurality of reels may be simulated by processor 204 within the columns of matrix 402 to cause a reel outcome, including a plurality of symbols, to be displayed from the plurality of reel strips within the columns of matrix 402.

It will also be appreciated that symbols may be displayed in matrix 402 in response to one or more player wagers and/or, in some cases, when one or more free spins are awarded. Symbols may, in addition, be selected randomly, such as based upon a random number provided by RNG 212 and/or, in at least some embodiments, based upon one or more bingo game outcomes. Similarly, in at least some embodiments, one or more random numbers may be provided by RNG engine 316.

In the example embodiment, user interface 400 also includes a bonus meter 405, which may be displayed, in at least some embodiments, in a position adjacent to and/or above matrix 402. In some embodiments, bonus meter 405 may also be referred to as a "repeat" meter, as described herein, because a prize value displayed by bonus meter 405 may be repeatedly provided to a player.

Similarly, user interface 400 may also include one or more jackpot meters 406, which may be configured to increase in value.

A player may place a wager to initiate play of the game represented in user interface 400, which may cause a base game to be initiated. An input may be received via buttons 236 or another input device, such as a touch sensitive display device to initiate the base game and place a wager. In the base game, processor 204 may control a display device, such as primary or secondary display 240 and/or 242, to simulate spinning and stopping of a plurality of reels (as described above), and symbols to be displayed in each symbol position of matrix 402, forming the game outcome, or the base game outcome. User interface 400 also displays credit meter 410, denomination 412, bet amount 414, and win amount 416.

The symbols displayed in matrix 402 may be evaluated, such as by processor 204, to determine whether there are any winning combinations of symbols. Specifically, the symbols displayed in matrix 402 may be compared to one or more winning symbol combinations in a paytable of winning symbol combinations, and if there any winning symbol combinations are displayed, an award associated with each combination may be added to a player's credit balance.

In addition, the symbols displayed in matrix 402 may be evaluated to determine whether any designated symbols are displayed. As used herein, a "designated symbol" may include any symbol that displays a credit or cash value. For example, in FIG. 4, a first designated symbol 408 appears on column or reel 403*a* at row 404*a* within matrix 402. As shown, designated symbol 408 includes a credit value of "25" credits. In the example embodiment, a variety of designated symbols having the same and/or different credit or cash values may be included on the reel strips used to populate matrix 402. In other words, different designated symbols having different credit values may be displayed (or "land") in matrix 402 during one or more spins. Finally, although the terminology "designated symbol" is generally used herein, in some cases, designated symbols may also be referred to as "free game scatter symbols" to refer to the fact that designated symbols may also be used (as described below) to trigger a bonus game.

In response to the occurrence of a trigger condition to increment bonus meter, a cash or credit value associated with the designated symbols that form the trigger condition may be added to bonus meter 405. A trigger condition to increment bonus meter may be a quantity of designated symbols being displayed in the base game outcome either anywhere, or in a predefined, predetermined, or randomly determined quantity of consecutive columns (or reels) in matrix 402, For example, in FIG. 4, the credit value of "25" credits displayed on designated symbol 408 may be added (in "bulk") to bonus meter 405, thereby increasing a bonus prize displayed by bonus meter 405 from "575" credits to "600" credits. The trigger condition, in this example, is the occurrence of designated symbols in a predefined quantity of consecutive columns, which in this example is one or more but less than three, starting from the leftmost column in which the first designated symbol occurs. Therefore, in this example, the first designated symbol occurs in column 403*a* and the quantity of consecutive columns with designated symbols starting with column 403*a* is one (which is within the range of one or more but less than three), the trigger condition is met and the value of designated symbol 408 is added to the bonus meter. Designated symbol 409 also occurs at on reel 403*c* in row 402*a* but its value is not added to the credit meter since it is not part of the trigger condition in this example. In various embodiments, the trigger condition may be different, such as consecutive columns with designated symbols starting from the leftmost column, designated symbols in reels 403*b-d* etc. and other variations as will be apparent to those skilled in the art. In certain embodiments, the trigger condition is defined as a near miss to a bonus trigger condition. For example, a bonus trigger condition may require designated symbols to occur in three consecutive columns, starting from the leftmost column in which the first designated symbol appears. For example, designated symbols appearing in (a) columns 403*a-c*; (b) columns 403*b-d*; or (c) columns 403*c-e* may be part of a bonus trigger. Therefore, designated symbols occurring in (a) columns 403*a* and 403*b* but not 403*c*; (b) columns 403*b* and 403*c* but not 403*d*; or (c) columns 403*c* and 403*d* but not 403*e* would constitute a near miss condition. However, designated symbols occurring in columns 403*d* and 403*e* but not 403*c* would not constitute a near miss condition, since the moment reel 403*c* stopped spinning and doesn't include a designated symbol in reels 403*a-c*, a player would realize that there is no opportunity to form a bonus trigger condition. In certain of these embodiments, reels 403*a-e* are displayed stopping in a left to right order, i.e., reels 403*a-e* stop in order, one after the other.

In at least one embodiment, trigger conditions for determining whether to add a credit value to bonus meter 405 from one or more designated symbols appearing in matrix 402 may specify that a credit value of a designated symbol landing in a leftmost column (i.e., column 403*a*), is added to bonus meter 405 only when no designated symbols land in columns 403*b* and 403*c*. This type of outcome would have 1 out of the 3 symbols required to trigger the bonus game. Similarly, if one or more designated symbols land in columns 403*a* and 403*b* and a designated symbol is not displayed in the column 403*c*, the credit values displayed by the designated symbols in columns 403*a* and 403*b* are added to bonus meter 405. This type of outcome would have 2 out of the 3 columns required to trigger the bonus game. Further, in this circumstance, credit values associated with designated symbols appearing on rightmost reels 403*d* and 403*e* may or may not be added to bonus meter 405. However, if designated symbols land in either of columns 403*b* or 403*c*, but no designated symbol is also displayed in the leftmost column (i.e., column 403*a*), the credit values displayed by the designated symbols in columns 403*b* and 403*c* are not added to bonus meter 405. In this circumstance, credit values associated with designated symbols appearing on rightmost reels 403*d* and 403*e* are also not added to bonus meter 405. Thus, in more general terms, and in at least some embodiments, a determination whether to add credit values to bonus meter 405 from one or more designated symbols may depend upon whether a designated symbol lands in the leftmost column (i.e., column 403*a*). Evaluation proceeds thereafter from left to right within matrix 402.

In some embodiments, an animation (e.g., a lightning bolt or an electrical spark) may be used to show transfer of a credit value on a designated symbol to bonus meter 405.

In some embodiments, the trigger condition to increment bonus meter is met when a quantity of designated symbols are displayed in the base game outcome. The quantity of designated symbols may be a predefined, predetermined, or randomly determined quantity. For example, the bonus meter 405 may be incremented when the quantity of designated symbols is less than six, but greater than zero.

Figure 5:
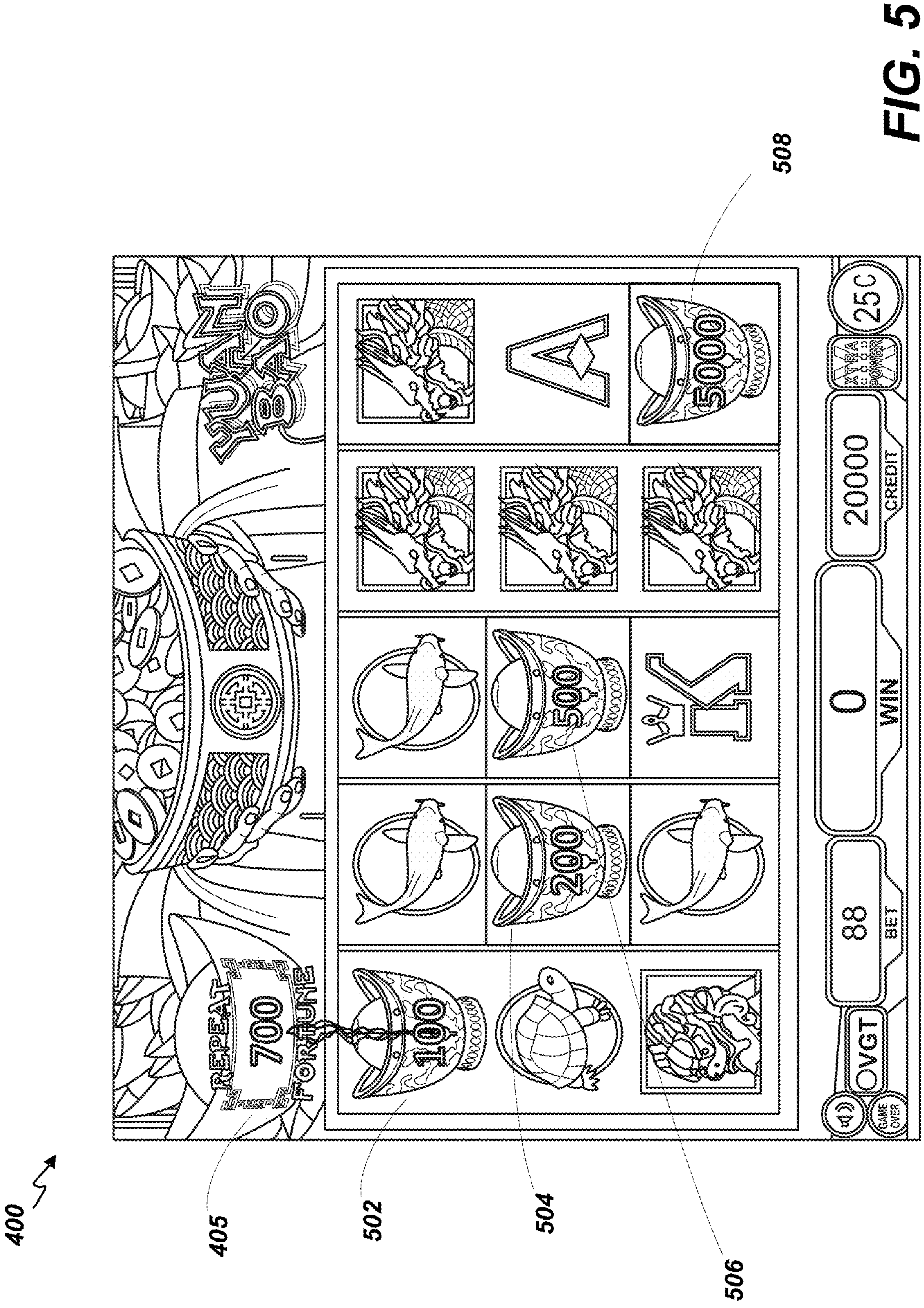
FIG. 5 is a screenshot of the wagering game shown in FIG. 4, in which a second designated symbol is displayed in the matrix of symbol positions, and in which a prize associated with the second designated symbol is added to the bonus meter.
Figure 6:
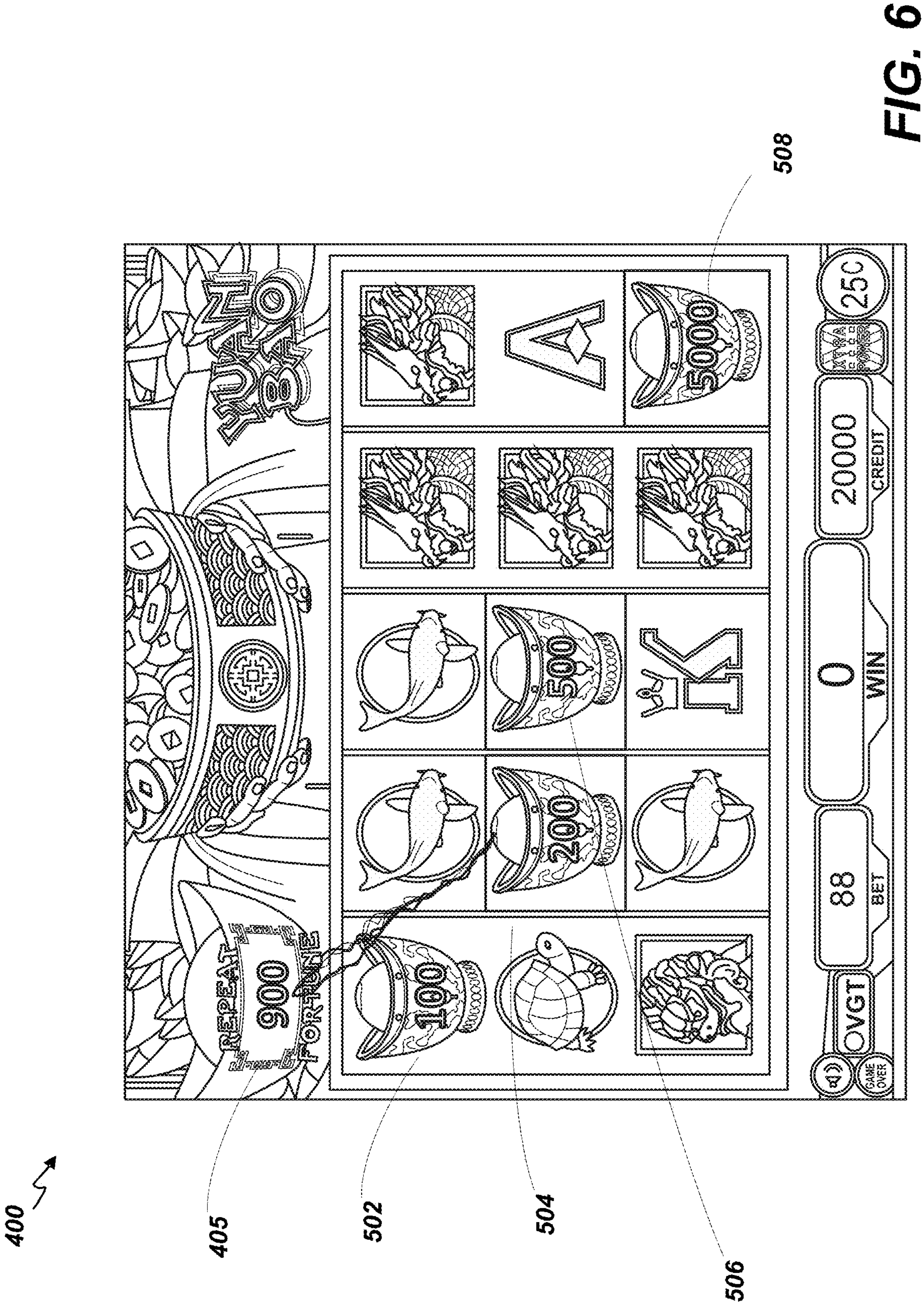
FIG. 6 is a screenshot of the wagering game shown in FIG. 4, in which a third and a fourth designated symbol are displayed in the matrix of symbol positions, and in which prizes associated with the third and fourth designated symbols are added to the bonus meter.

FIG. 5 and FIG. 6 show continued progression of the base game begun with reference to FIG. 4. Specifically, FIG. 5 is a screenshot of user interface 400, in which a first designated symbol 502, a second designated symbol 504, a third designated symbol 506, and a fourth designated symbol 508 are displayed in matrix 402 in response to a subsequent wager placed by the player and following a subsequent spin or play of the base game. Accordingly, as shown, the credit values shown in association with one or more designated symbols 502-508 may be added to bonus meter 405. As discussed with reference to FIG. 4, the trigger condition requires designated symbols to occur in consecutive columns, therefore, only credit values associated with trigger symbols 502-506 may be added to bonus meter 405.

In some embodiments, a credit value displayed by each designated symbol may always be added to bonus meter 405. However, in at least some embodiments, a plurality of trigger conditions may be used to determine whether a credit value displayed by a designated symbol occurring in matrix 402 will be added to bonus meter 405.

In various embodiments, the trigger condition is based on a near miss event, i.e., an outcome that did not triggered the play of a bonus game, provided a jackpot win, provided a line win (or Reel Power win), etc. but was close to providing the bonus game, jackpot win, line win, etc., and to compensate the player (and build some equity in the prize) the bonus meter is incremented.

Accordingly, in the example outcome of FIG. 5, the credit values from the designated symbols 502, 504, and 506 are added to bonus meter 405 to increase the prize value displayed by bonus meter to a total of 1700 credits.

In addition to adding credit values from one or more designated symbols to bonus meter 405, processor 204 may evaluate the designated symbols displayed in matrix 402 to determine whether a bonus game triggering condition is satisfied. Specifically, in at least some embodiments, a bonus game may be triggered if each of the first three columns of matrix 402 (i.e., columns 403*a*-*c*) include a designated symbol. In other embodiments, other suitable trigger conditions may be used to determine whether to trigger the bonus game. In some embodiments, the credit values associated with the designated symbols that form the bonus trigger condition may be added to bonus meter 405. In some embodiments, the credit values associated with the designated symbols that form the bonus game triggering condition may not be added to bonus meter 405.

Figure 7:
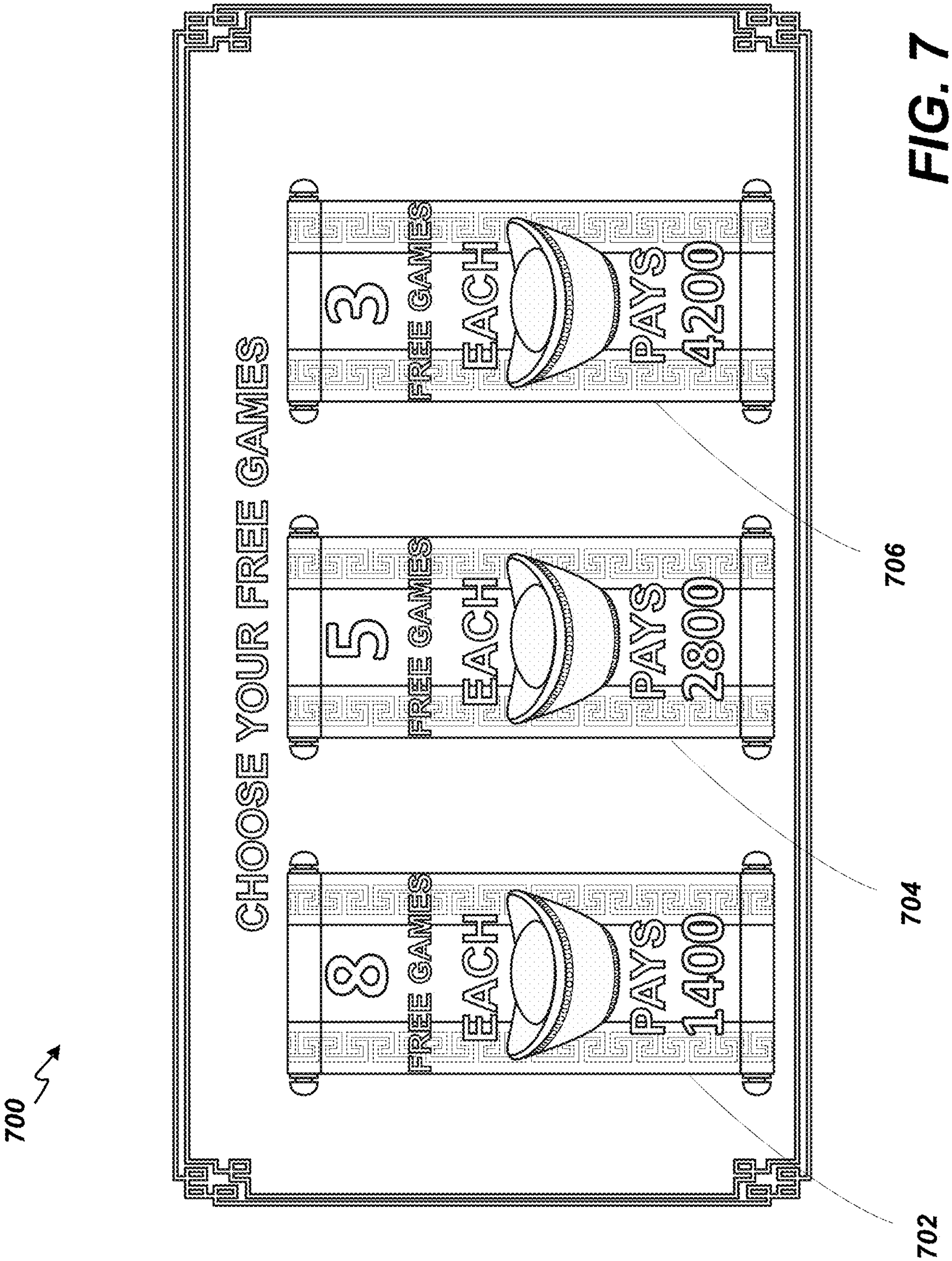
FIG. 7 is a screenshot of a volatility selection interface of the wagering game shown in FIG. 4, in which a player is enabled to select a volatility option from a plurality of volatility options, where each volatility option is associated with a plurality of free spins and a multiple of the bonus meter.

At the start of a bonus game, a volatility selection interface 700 may be displayed, which permits selection, via an input device by the player, of one volatility option of a plurality of volatility options. FIG. 7 is a screenshot of an exemplary volatility selection interface 700.

In the example embodiment, volatility selection interface 700 displays three volatility options. These include a first volatility option 702, a second volatility option 704, and a third volatility option 706. Although three volatility options are shown, in other embodiments, any suitable number of volatility options may be provided.

Each volatility option 702-706 is associated with a multiple or similar increment or percentage of the bonus prize displayed in bonus meter 405 at the start of the bonus game. Each volatility option is also associated with a plurality of free spins. For example, volatility option 702 is associated with a prize value of 1400 credits and eight free spins, where 1400 credits is the same as the value displayed by bonus meter 405 (as described above). Thereafter, as above, the remaining volatility options 704-706 may be associated with increasing percentages of the prize value displayed by bonus meter 405. However, in this embodiment, one advantage may be that the first volatility option 702 does not provide a credit value that is less than the prize value displayed in bonus meter 405. In the example embodiment, volatility option 704 is associated with a prize value of 2800 credits and five free spins, where 2800 credits is twice of the value displayed by bonus meter 405. In addition, volatility option 706 is associated with a prize value of 4200 credits and three free spins, where 4200 credits is approximately three times the credits displayed by bonus meter 405.

Although each volatility option 702-706 displays a specific percentage of the prize value displayed by bonus meter 405 and a specific number of free spins in the example of FIG. 7, it will be appreciated that these numbers are merely illustrative, and that any multiple or percentage of the prize value displayed by bonus meter 405 may be used in conjunction with any suitable number of free spins. Generally, in at least some embodiments, the multiple or percentage of the prize value display by bonus meter 405 provided in association with a volatility option 702-706 may increase as the number of free spins decreases. For example, in some embodiments, the prize values associated with the volatility option may be 2800, 5600, and 11200.

In certain embodiments, the prize value and the quantity of free spins associated with each volatility option may be predefined. For example, volatility option 1 may be predefined as 1× bonus meter 405 with 8 free spins, volatility option 2 may be predefined as 2× bonus meter 405 with 5 free spins, and volatility option 3 may be predefined as 3× bonus meter 405 with 3 free spins. In certain embodiments, the prize value and quantity of free spins may be determined by processor 204. For example, for each volatility option, weighted table may be provided that may have options corresponding to the prize value and another weighted table for the quantity of free spins. In certain embodiments, processor 204 may receive prize values and quantity of free spins for one or more of the volatility options from a central server, such as a bingo server, a central determination server, or a progressive server. In certain embodiments, the quantity of volatility options may be predetermined, randomly determined or player determined. In certain embodiments, it may be based on a player's wager level. For example, at a first level, only two of the three volatility options shown in FIG. 7 may be available, and at a second, usually higher level, all three volatility options shown in FIG. 7 may be available and displayed.

Figure 8:
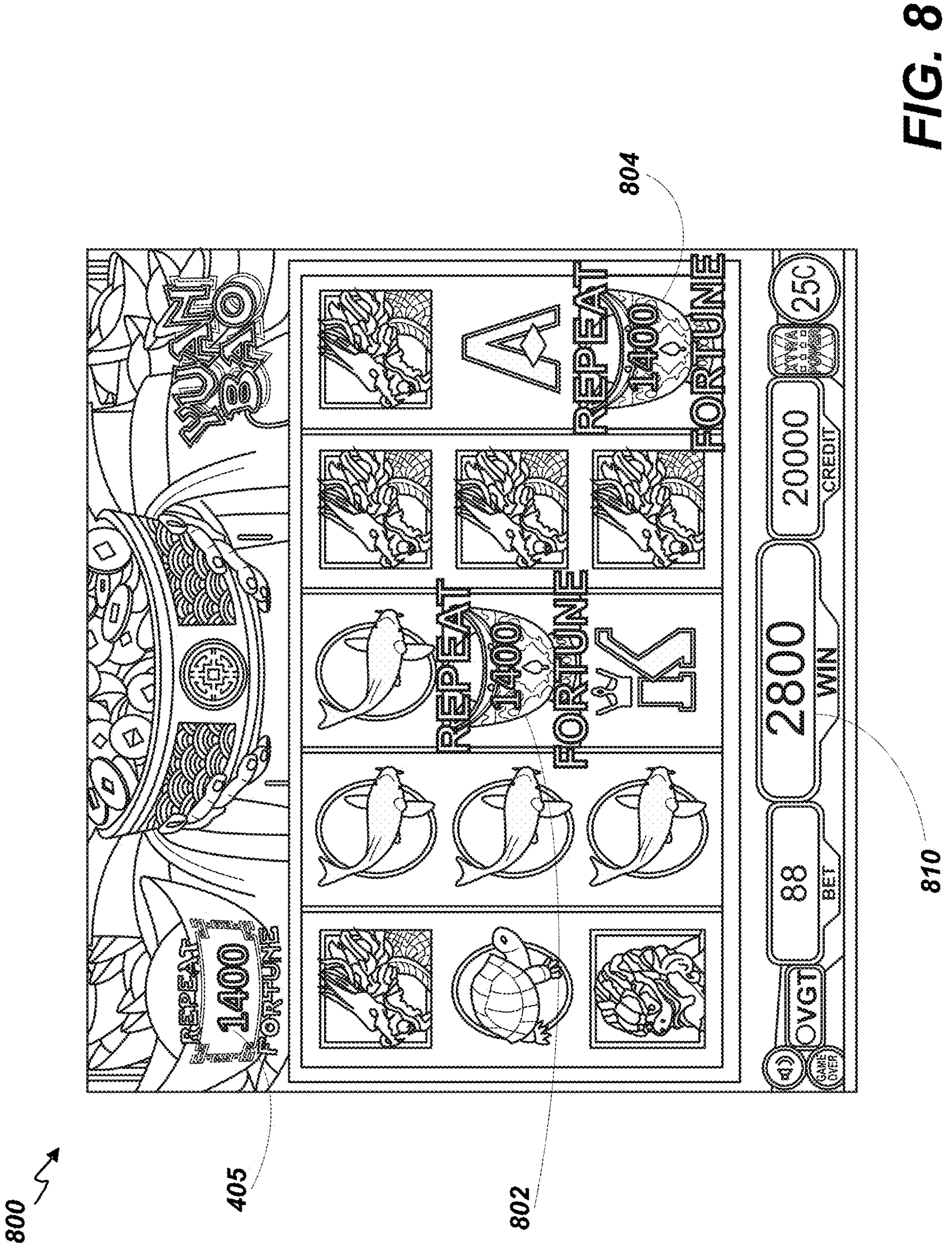
FIG. 8 is a screenshot of a bonus game of the wagering game shown in FIG. 4, in which several designated symbols are displayed in the matrix of symbol positions, and in which each designated symbol causes the selected multiple of the bonus meter to be added to a credit balance of the player.

FIG. 8 is a screenshot of the bonus game of user interface 800. More particularly, once a player makes a volatility selection from volatility selection interface 700, matrix 402 may once again be displayed, and the reel strips spun and stopped within matrix 402 to display a plurality of symbols. In certain embodiments, reel strips used for the bonus game may differ from the reel strips used in the base game. In certain embodiments, matrix 402 may be replaced with another matrix having a different quantity of rows and/or columns than those in matrix 402. Processor 204 may evaluate the symbols displayed in matrix 402 to determine whether any designated symbols (e.g., free game scatter symbols) are displayed, and if so, processor 204 may award the prize value associated with the selected volatility option of the volatility options 702-706 to the player for each occurrence of the designated symbol in matrix 402.

For instance, in the example of FIG. 8, it can be seen that the player has selected volatility option 702, which is associated with a prize value of 1400 credits, and eight free spins. Accordingly, during a first spin of the eight free spins, a designated symbol lands in symbol positions "2C" and "3E." As a result, the prize value of 1400 credits is added to the win meter (i.e., once for each occurrence of the designated symbol in matrix 402). Thereafter, the reels are re-spun and the symbols landing in matrix 402 are reevaluated as described to determine whether to provide additional 1400 credit prizes to the player.

In the example shown in FIG. 8, the prize value associated with the selected volatility option may be repeatedly provided, such as each time a designated symbol appears in matrix 402 during a bonus game of user interface 400. In addition, as described herein, the prize value may be a multiple or percentage of a prize value display within bonus meter 405, which is accumulated during a base game of user interface 400 based upon credit values displayed on designated symbols appearing within matrix 402. In various embodiments, the designated symbol displayed in the bonus game does not display any associated credit value or currency value on its face, since the credit value associated with the designated symbol is the value of the bonus meter. In some embodiments, the value of the bonus meter at the start of the bonus game is displayed on the designated symbol. After each spin of the quantity of free spins has been displayed and the outcomes determined, a total prize value accumulated during the free spin bonus game is added to the credit meter. This may be in addition to any award amounts resulting from winning symbol outcomes in the free spin bonus game.

In certain embodiments, reel strips used in the play of the bonus free spin game may be different than the reel strips used in the play of the base game. The reel strips may use different set of symbols, have a different paytable than the base game, and/or employ a different quantity of rows or columns.

Figure 9:
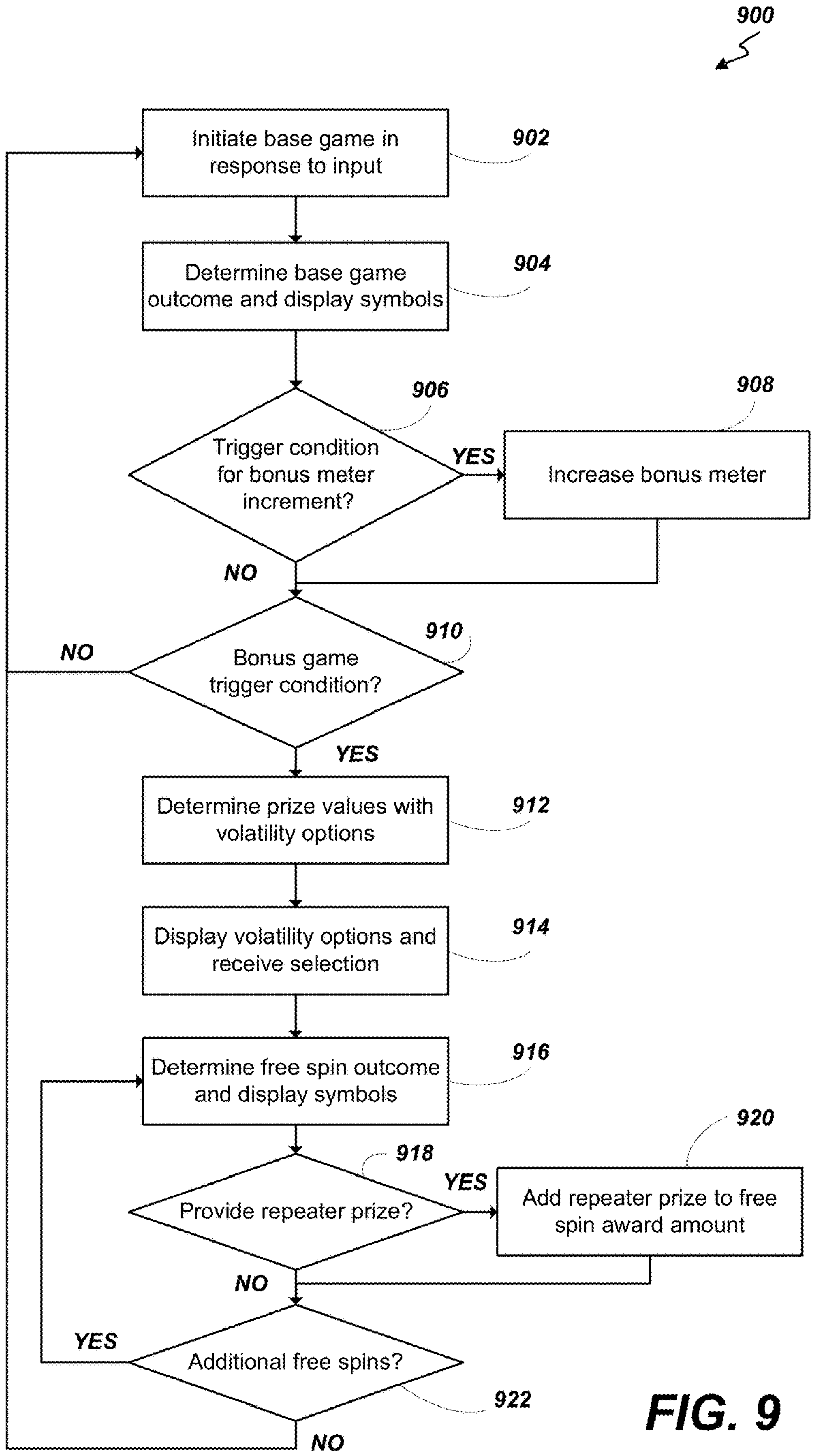
FIG. 9 is a screenshot of a jackpot game of the wagering game shown in FIG. 4.

FIG. 9 is an exemplary flowchart illustrating a process implemented by a gaming device in accordance with some embodiments of the present disclosure. Process 900 may begin at block 902 where a base game, such as one shown in FIG. 4, is initiated. The game may be initiated in response to a player input, via an input interface, such as buttons 236. The input may also initiate a wager. At block 904, a base game outcome is determined and displayed by processor 204. The base game outcome may be determined using the output of a random number generator, such as from RNG engine 316. RNG conversion engine 320 may generate a game outcome based on the random number(s) from RNG engine 316. The game outcome is displayed as a number of reels spinning and stopping at positions that correspond to reel stop positions determined by RNG conversion engine 320. FIG. 4 depicts an exemplary outcome generated from RNG conversion engine 320. In certain embodiments, instead of using a random number from RNG engine 316, a bingo outcome may be used. The bingo outcome is based on a bingo ball call, usually from a bingo server, and a bingo card that is specific to the gaming device for a single play. In some embodiments, a central determination system may provide an outcome.

Processor 204 may determine whether the displayed symbols in matrix 402 form a trigger condition to increment bonus meter. As described herein, the trigger condition may be a near miss condition. In certain embodiments, the trigger condition may be symbol based, i.e., based on the symbols in the outcome. In certain embodiments, the trigger condition may not be based on the symbols in the outcome. For example, the trigger condition may be a random determination separate from the one used for determining the symbols. The trigger condition may be based on a jackpot controller or another device. If processor 204 determines that the trigger condition has been satisfied, bonus meter may be incremented at block 908. As shown in FIG. 4, bonus meter 405 is incremented with the value of designated symbol 408 and not 409, as designated symbol 408 forms part of the trigger condition, while symbol 409 is not part of the trigger condition. In certain embodiments, if there are multiple designated symbols in a single column, then the values associated with each of those multiple designated symbols are added to bonus meter 405.

At block 910, processor 204 may determine whether a bonus trigger condition exists. In various embodiments, a bonus trigger condition is different from a trigger condition that increments bonus meter. Further, in certain embodiments, the bonus trigger condition and the trigger condition that increments bonus meter are mutually exclusive. Hence, if processor 204 determines that trigger condition for bonus meter increment is met at 906, control may move to 902 after bonus meter is incremented without checking whether trigger condition for bonus game exists at 910. In certain embodiments, the bonus game trigger condition may require designated symbol in three consecutive columns. Further, in certain embodiments, the values of designated symbols that form the bonus game trigger condition may be added to bonus meter 405.

In certain embodiments, if processor 204 determines that bonus game trigger condition is met, processor 204 determines the quantity and the volatility options to be presented, at 912. Volatility options may be based on be based on the bonus meter 405 value, as discussed herein. At 914, a volatility selected screen is presented, such as the one shown in FIG. 7. The volatility selection screen displays multiple volatility selection options, as determined by processor 204 at 912. An input associated with one of the multiple volatility options indicates the player selected volatility option.

A free spin bonus game may then be initiated, based on the player selected volatility option. A quantity of free spins in the free spin game may be dependents on the selected volatility option. In certain embodiments, where the selected volatility options corresponds to a multiple of the value in bonus meter 405, bonus meter 405 may be updated to reflect the multiple. In certain embodiments, a multiplier may be displayed next to bonus meter 405 to indicate the selected multiple.

At 916, a free spin outcome for the free spin bonus game is generated by processor 204. The outcome is displayed, as shown in FIG. 8. Processor 204 determines whether the free spin outcome includes one or more designated repeat symbols at 918. If the outcome includes a designated repeat symbol, the processor may provide the award value of bonus meter 405 based on the player selected volatility option in FIG. 7, at 920. The award value may be added to bonus win meter 810. For example, if the player choose volatility option 704 that uses a 2× multiplier, the designated repeat symbol is associated with 2× of the bonus meter value. However, in the example of FIG. 8, the award provided is 1× the bonus meter value which corresponds to player selected volatility option 702. In certain embodiments only one instance the repeat award is provided for one or more instances of a designated symbol 802 occurring in the in the free spin outcome. In certain embodiments, for each instance of the designated symbol, such as symbol 802 and 804, the value of bonus meter is added to bonus win meter 810 as many times. Since there are 2 designated symbols in the free spin outcome shown in FIG. 8, the value of bonus meter 405 is added twice to bonus win meter 810. In certain embodiments, the value of bonus meter is awarded when certain trigger conditions are met. For example, a certain quantity of designated symbols might be required in the outcome, in order for the award value of bonus meter 405 being added to bonus win meter 810.

At 922, processor 204 may determine if any additional free spins remain. If there are free spins remaining, control returns to 916, otherwise play of the free spin bonus game ends. When the free spin bonus game ends, the value of the bonus win meter 810 may be added to the player's credit meter 410 and control returns to 902.

Figure 10:
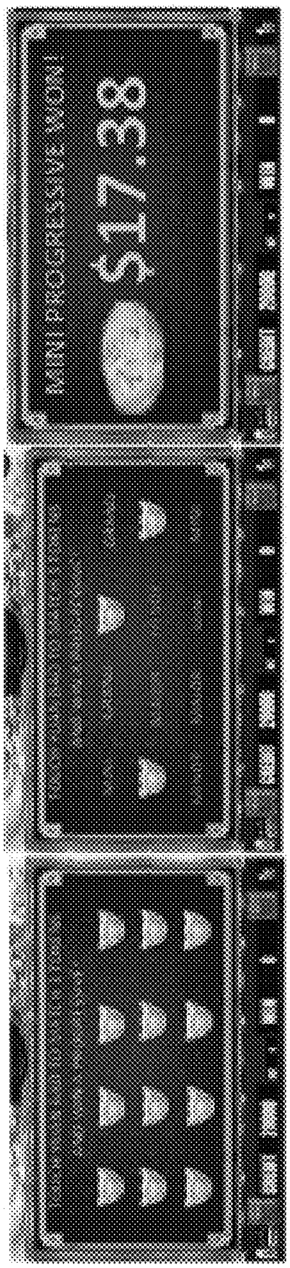
FIG. 10 is a screenshot of a jackpot game according to an embodiment of the present disclosure.

FIG. 10 is a screenshot of a jackpot game 1000 user interface 400. More particularly, in at least some embodiments, one or more jackpot symbols, such as "coin symbols," may appear in matrix 402 during base game shown in user interface 400. In response to the occurrence of each jackpot symbol, jackpot meter 406 may "metamorphose," as described above, to provide a visual indication that a prize value of the jackpot has increased. In addition, each time a jackpot symbol lands (or in response to a predefined combination of jackpot symbols, such as three scattered jackpot symbols in matrix 402), processor 204 may determine whether to provide jackpot game 900. If jackpot game 900 is provided, the player may be allowed to play a game, such as a "pick" game, as shown, during which the player selects or "overturns" a plurality of jackpot symbols until a predefined number of instances of a particular jackpot prize of plurality of jackpot prizes (in this example, three instances of the MINI jackpot prize) are uncovered. Although a "pick" game is shown in the example of FIG. 10, any of a variety of suitable jackpot games may be implemented in the present disclosure to provide a jackpot award to a player.

In certain embodiments, credit values associated with the designated symbols displayed in the play of the base game, are predetermined. In certain embodiments, they may be randomly determined. For example, a table may store possible credit values associated with designated symbols. Processor 204 may select credit values from this table to assign to various designated symbols that are to be selected in a particular outcome. The table may be weighted so that certain values have a higher probability of being selected.

In certain embodiments, credit values associated with the designated symbols displayed in the play of the free spin bonus game, are predetermined. In certain embodiments, they may be randomly determined. For example, a table may store possible credit values associated with designated symbols. Processor 204 may select credit values from this table to assign to various designated symbols that are to be selected in a particular outcome. The table may be weighted so that certain values have a higher probability of being selected.

In certain embodiments, a bonus game different from the free spin bonus game may be provided. For example, a selection or pick bonus game may be provided, where certain designated symbols may be hidden and revealed when picked. Those skilled in the art will recognize that other bonus games are within the scope of the present disclosure.

Initially, the value of bonus meter 405 is set to a predetermined or randomly determined value. The value of bonus meter 405 can continue to increase during game play, based on the occurrence of trigger conditions. As the value grows, a player may feel a sense of accomplishment in growing the value and the continued building of equity in the game. This may cause the player to extend a play session, in order to try and win the value accumulated in bonus meter. After the completion of a free spin bonus game in which the value of bonus meter 405 is awarded at least once (or a predetermined times), the value of bonus meter may reset to a starting value (that is predetermined or randomly determined). In certain embodiments, the value may not be reset after completion Embodiments of the present disclosure thus provide systems and methods for incrementing a bonus prize based upon credit values displayed on designated symbols appearing in a matrix of symbol positions of a base game. In addition to incrementing the bonus prize during the base game, a bonus game may be triggered based upon the occurrence of one or more designated symbols in the matrix. During the bonus game, a player may select a volatility option, which may be used to determine to adjust (e.g., increase) the prize value accumulated in the base game. The selected volatility option may also specify a number of free spins. Once a volatility selection is made by the player, the player is awarded the number of free spins associated with the option, and during each free spin, if any designated symbols land in the matrix, the player is provided the adjusted prize value for each occurrence of a designated symbol. Thus, the adjusted prize value may be repeatedly provided to a player over the course of a plurality of free spins.

Although the flowchart of FIG. 9 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system:

at least one processor; and at least one memory storing instructions, which when executed by the at least one processor, cause the at least one processor to:

cause a display device to display a base game outcome and a bonus meter including a current award amount;

determine that a bonus meter condition stored in the at least one memory is satisfied based on a plurality of symbols of the base game outcome;

cause the current award amount of the bonus meter to be incremented by an amount associated with the base game outcome to an updated award amount based on the bonus meter condition being satisfied;

determine that the plurality of symbols of the base game outcome satisfies a bonus game trigger condition stored in the at least one memory;

in response to the bonus trigger condition being satisfied, generate a plurality of random number generator outcomes, each of the plurality of random number generator outcomes associated with one of a plurality of volatility options;

for each respective one of the plurality of volatility options, perform a lookup within the at least one lookup table stored within the at least on memory based on i) the updated award amount, and ii) the random number generator outcome corresponding to the respective one of the plurality of volatility options;

for each respective one of the plurality of volatility options, identify, based on the lookup, i) a respective number of free spins and ii) a respective multiple of the updated award amount;

cause the display device to display the plurality of volatility options including i) the respective number of free spins and ii) the respective multiple of the updated award amount;

receive, from an input device, a selection of a first volatility option of the plurality of volatility options; and cause the display device to display one or more bonus game outcomes generated based on the respective number of free spins associated with the first volatility option, the respective multiple of the updated award amount associated with the first volatility option, and the updated award amount.

2. The electronic gaming system of claim 1, wherein the instructions further cause the at least one processor to cause the display device to display an animation extending between the bonus meter and at least one symbol position associated with the bonus meter trigger condition being satisfied.

3. The electronic gaming system of claim 1, wherein the bonus game trigger condition is different from the bonus meter trigger condition.

4. The electronic gaming system of claim 3, wherein the base game outcome includes a plurality of symbol positions is arranged in a plurality of columns.

5. The electronic gaming system of claim 4, wherein the bonus meter trigger condition is satisfied when a first quantity of at least one symbol is displayed in consecutive columns of the plurality of columns.

6. The electronic gaming system of claim 5, wherein the first quantity is two.

7. The electronic gaming system of claim 5, wherein the bonus game triggering condition is satisfied when a second quantity of the at least one symbol is displayed in consecutive columns of the plurality of columns, wherein the second quantity is greater than the first quantity.

8. The electronic gaming system of claim 1, wherein the instructions further cause the at least one processor to, for each of the bonus game outcomes:

cause the display device to display a plurality of bonus game symbols in a plurality of bonus symbol positions;

evaluate the plurality of bonus symbol positions to determine whether the plurality of bonus symbol positions include a first quantity of bonus award trigger symbols; and in response to determining that the plurality of bonus symbol positions include the first quantity of bonus award trigger symbols, add the respective multiple of the current award amount shown on the bonus meter to a free spin award amount.

9. The electronic gaming system of claim 8, wherein the instructions further cause the at least one processor to add the respective multiple of the current award amount to the free spin award amount a second time when the first quantity of bonus award trigger symbols is at least two.

10. A method for electronic gaming comprising causing a display device to display a base game outcome and a bonus meter including a current award amount;

determining that a bonus meter condition stored in the at least one memory is satisfied based on a plurality of symbols of the base game outcome;

causing the current award amount of the bonus meter to be incremented by an amount associated with the base game outcome to an updated award amount based on the bonus meter condition being satisfied;

determining that the plurality of symbols of the base game outcome satisfies a bonus game trigger condition stored in the at least one memory;

in response to the bonus trigger condition being satisfied, generating a plurality of random number generator outcomes, each of the plurality of random number generator outcomes associated with one of a plurality of volatility options;

for each respective one of the plurality of volatility options, performing a lookup within the at least one lookup table stored within the at least on memory based on i) the updated award amount, and ii) the random number generator outcome corresponding to the respective one of the plurality of volatility options;

for each respective one of the plurality of volatility options, identifying, based on the lookup, i) a respective number of free spins and ii) a respective multiple of the updated award amount;

causing the display device to display the plurality of volatility options including i) the respective number of free spins and ii) the respective multiple of the updated award amount;

receiving, from an input device, a selection of a first volatility option of the plurality of volatility options; and causing the display device to display one or more bonus game outcomes generated based on the respective number of free spins associated with the first volatility option, the respective multiple of the updated award amount associated with the first volatility option, and the updated award amount.

11. The method of claim 10, further comprising causing the display device to display an animation extending between the bonus meter and at least one symbol position associated the bonus meter trigger condition being satisfied.

12. The method of claim 10, wherein the bonus game trigger condition is different from the bonus meter trigger condition.

13. The method of claim 12, wherein the base game outcome includes a plurality of symbol positions is arranged in a plurality of columns.

14. The method of claim 13, wherein the bonus meter trigger condition is satisfied when a first quantity of at least one symbol is displayed in consecutive columns of the plurality of columns.

15. The method of claim 14, wherein the first quantity is two.

16. The method of claim 14, wherein the bonus game triggering condition is satisfied when a second quantity of the at least one symbol is displayed in consecutive columns of the plurality of columns, wherein the second quantity is greater than the first quantity.

17. The method of claim 10, comprising, for each of the bonus game outcomes:

causing the display device to display a plurality of bonus game symbols in a plurality of bonus symbol positions;

evaluating the plurality of bonus symbol positions to determine whether the plurality of bonus symbol positions include a first quantity of bonus award trigger symbols; and in response to determining that the plurality of bonus symbol positions include the first quantity of bonus award trigger symbols, adding the respective multiple of the current award amount shown on the bonus meter to a free spin award amount.

18. At least one non-transitory computer-readable storage media having computer-executable instructions embodied thereon, wherein when executed by at least one processor in communication with at least one memory, the computer-executable instructions cause the at least one processor to:

cause a display device to display a base game outcome and a bonus meter including a current award amount;

determine that a bonus meter condition stored in the at least one memory is satisfied based on a plurality of symbols of the base game outcome;

cause the current award amount of the bonus meter to be incremented by an amount associated with the base game outcome to an updated award amount based on the bonus meter condition being satisfied;

determine that the plurality of symbols of the base game outcome satisfies a bonus game trigger condition stored in the at least one memory;

in response to the bonus trigger condition being satisfied, generate a plurality of random number generator outcomes, each of the plurality of random number generator outcomes associated with one of a plurality of volatility options;

for each respective one of the plurality of volatility options, perform a lookup within the at least one lookup table stored within the at least on memory based on i) the updated award amount, and ii) the random number generator outcome corresponding to the respective one of the plurality of volatility options;

for each respective one of the plurality of volatility options, identify, based on the lookup, i) a respective number of free spins and ii) a respective multiple of the updated award amount;

cause the display device to display the plurality of volatility options including i) the respective number of free spins and ii) the respective multiple of the updated award amount;

receive, from an input device, a selection of a first volatility option of the plurality of volatility options; and cause the display device to display one or more bonus game outcomes generated based on the respective number of free spins associated with the first volatility option, the respective multiple of the updated award amount associated with the first volatility option, and the updated award amount.

* * * * *